United States Patent [19]

Taylor

[11] 4,402,334

[45] Sep. 6, 1983

[54] RUPTURE BAND RELIEF VALVE

[76] Inventor: Julian S. Taylor, 8300 SW. 8, Oklahoma City, Okla. 73108

[21] Appl. No.: 330,538

[22] Filed: Dec. 14, 1981

Related U.S. Application Data

[63] Continuation-in-part of Ser. No. 159,263, Jun. 13, 1980, Pat. No. 4,317,470.

[51] Int. Cl.³ ............................................. F16K 13/04
[52] U.S. Cl. ....................................... 137/70; 137/71; 220/89 A
[58] Field of Search ............................ 137/69, 70, 71; 220/89 A

[56] References Cited

U.S. PATENT DOCUMENTS 2,115,371  4/1938  Mossberg .......................... 137/69 X
3,603,333  9/1971  Anderson ............................. 137/70

*Primary Examiner*—Harold W. Weakley
*Attorney, Agent, or Firm*—Robert K. Rhea

[57] ABSTRACT

In a pressure relief valve a valve body, having a lateral exhaust port, is provided with a valve moveable toward and away from a fluid inlet sealing face at its pressure connected end and guided by a valve stem projecting through the other end of the body. A radially projecting arm, connected with the valve body opposite its inlet end, supports a cylinder having a groove therein nesting a lever pivotally connected with the outwardly projecting end of the arm and overlying the outwardly projecting end of the valve stem for receiving at least one endless rupture band therearound and normally maintaining the valve closed. Excessive fluid pressure against the valve pivots the lever out of its groove and expands the endless band beyond its tensile strength limit which unseats and opens the valve.

7 Claims, 6 Drawing Figures

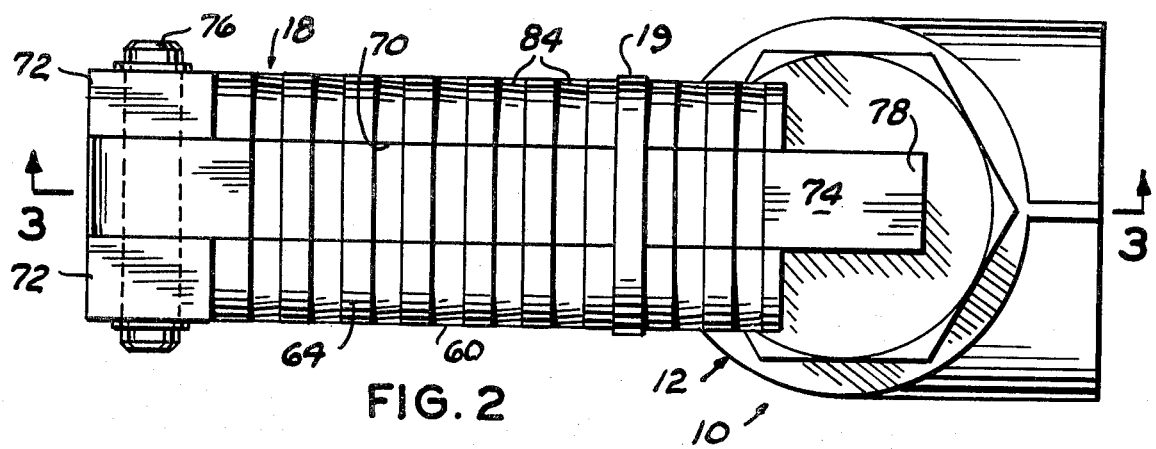
FIG. 2
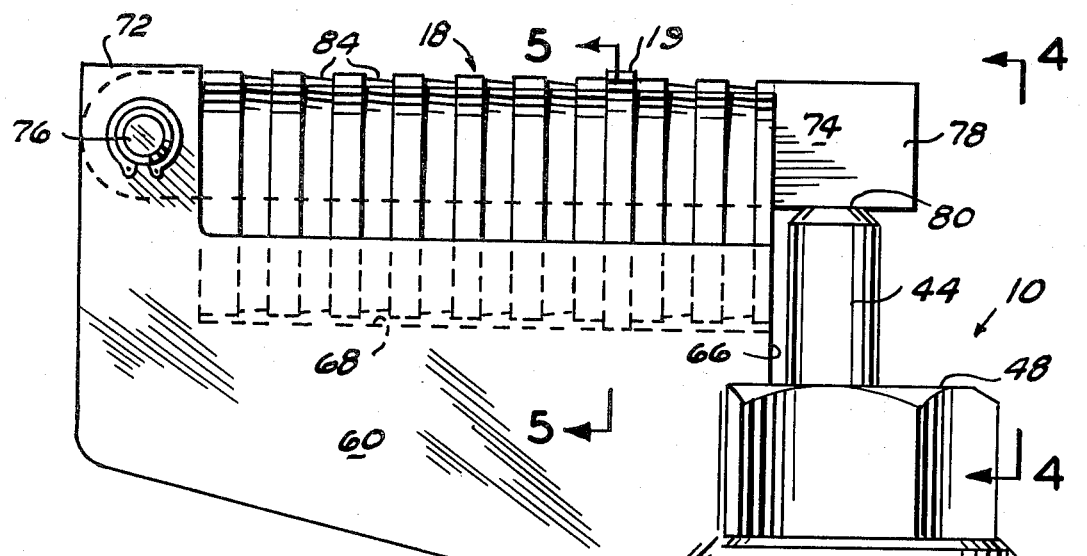
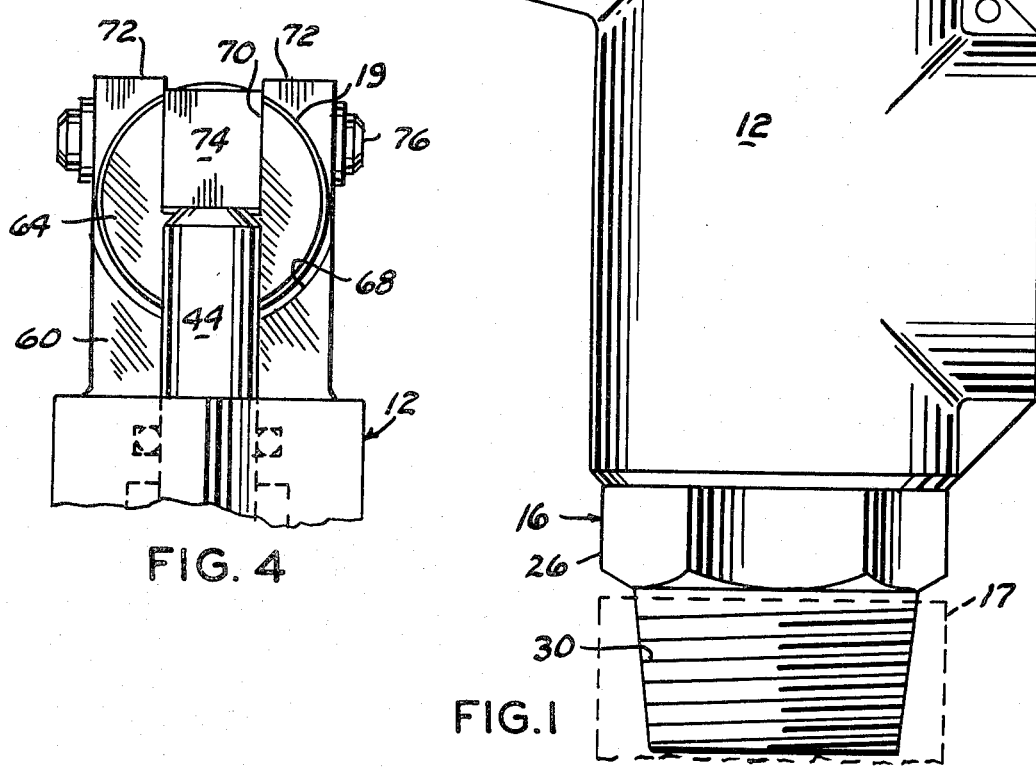
FIG. 4
FIG. 1

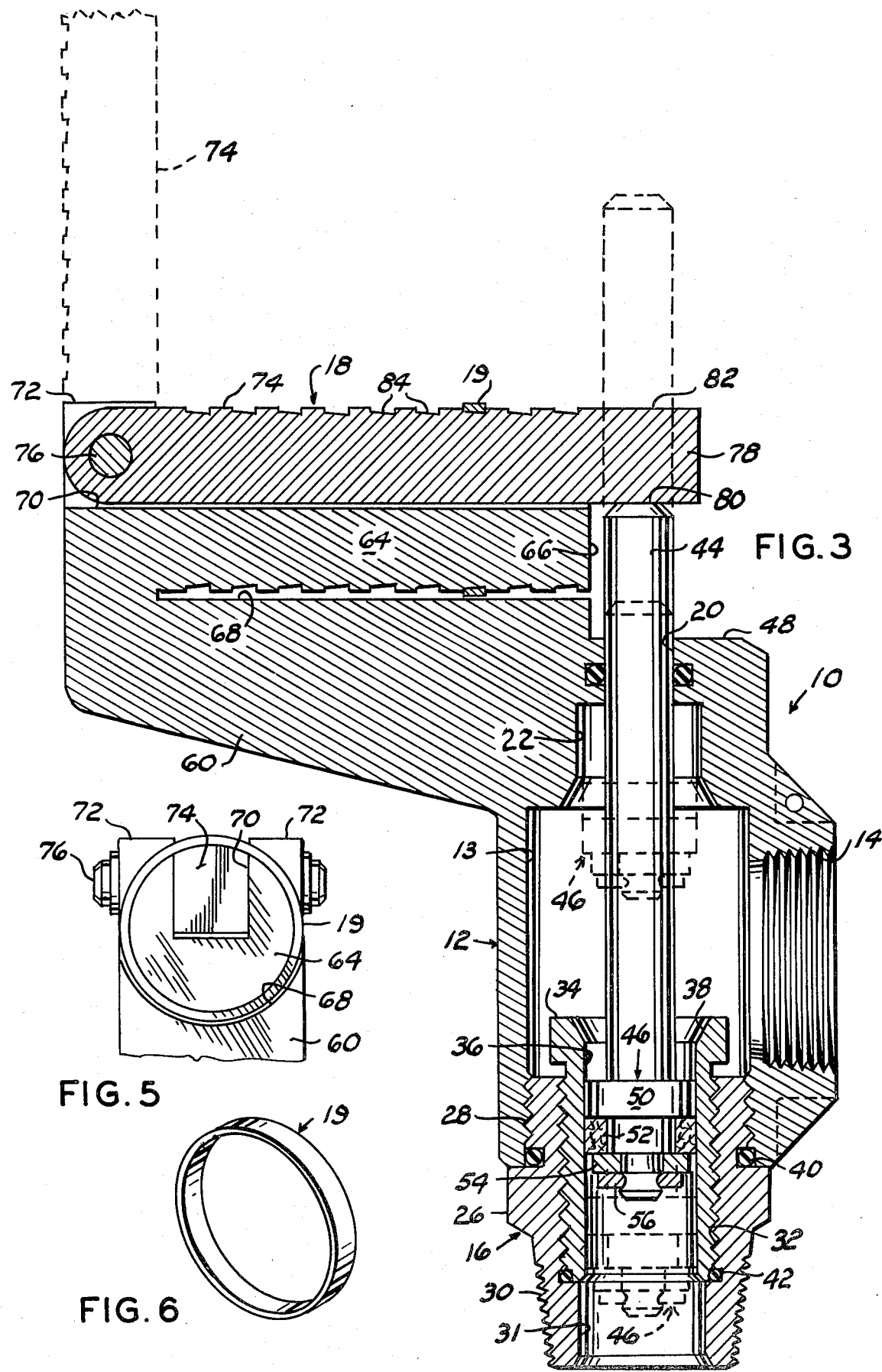

RUPTURE BAND RELIEF VALVE

CROSS REFERENCE TO RELATED APPLICATION

This application is a continuation-in-part of an application filed by me in the U.S. Patent and Trademark Office on June 13, 1980, under Ser. No. 159,263 for RUPTURE BAND RELIEF VALVE, now U.S. Pat. No. 4,317,470.

BACKGROUND OF THE INVENTION

1. Field of the Invention

The present invention relates to fluid pressure relief valves.

Relief valves are conventionally used in fluid pressure systems for the purpose of protecting the fluid pressure generating equipment, such as a cylinder, cylinder heads and bolts, pump valves, packing or cups, so that, in the event of malfunction or closing an external valve in error or excessive pressure as caused by a clogged drilling bit, the relief valve is biased to an open fluid discharge position enabling the operators to correct the malfunction without damage to the equipment. It is desirable to have a fluid pressure relief valve which may be calibrated in the field in accordance with the maximum fluid pressure to be generated. This invention provides such a relief valve.

2. Description of the Prior Art

Fluid pressure relief valves presently in use and as disclosed by prior patents generally relate to valve structure which includes a valve stem or mandrel moved longitudinally in response to predetermined fluid pressure which shears a pin, as in patent No. 4,082,104, or ruptures a frangible disk, as in U.S. Pat. No. 2,141,847. The pressure setting in which these valves open or release such pressure is predetermined by the pressure necessary to shear the shear pin or rupture the frangible disk. The pressure at which such a valve opens is thus predetermined by the known rating or shearing force required to shear a pin or rupture a frangible disk of predetermined thickness.

Shear type valves are dangerous in that they can be rendered inoperative by a workman, tired of resetting the valve, putting more than one shear pin or nail through the shear bar in the pin shear type safety relief valve or using extra strong metal, such as an Allen wrench through the shear stem. Rupture disk type valves have the disadvantage of being difficult to adjust the pressure release valve in the field since each disk normally has only one rupture value.

This invention overcomes this disadvantage by providing a pressure relief valve permitting a reduction in the pressure required to open the valve in accordance with a desired maximum pressure in a fluid system.

This invention is distinctive over the above named copending application by replacing the U-shaped rupture band supporting head with a lever overlying the fluid pressure moved valve stem and nested by a slot in a laterally projecting cylindrical member with the level pivoted vertically by excess pressure against the valve stem and in which an endless band of known tensile strength transversely surrounds the lever and cylindrical member at a predetermined position intermediate their length.

SUMMARY OF THE INVENTION

A valve body or housing, having an exhaust port normal to the axis of its inlet passage, is provided with a valve normally closing the inlet passage. The valve is provided with a valve stem axially aligned with its inlet passage which projects beyond the housing opposite the inlet passage. At its valve stem projecting end, the valve body is provided with a lateral projection characterized by a horizontal transversely grooved cylindrical portion having an upwardly open longitudinal groove therein pivotally supporting a lever overlying, at one end portion, the outwardly projecting end of the valve stem. An endless band of predetermined tensile strength transversely surrounds the lever and cylindrical member within a selected transverse groove normally preventing outward movement of the valve stem. The position of the endless band in combination with its tensile strength determines the pressure relief rating for the valve.

The principal object of this invention is to provide a fluid pressure safety relief valve in which an endless band of known tensile strength may be selectively disposed in predetermined positions for providing a relief valve of selective pressure setting.

BRIEF DESCRIPTION OF THE DRAWINGS

FIG. 1 is a side elevational view of the valve;

FIG. 2 is a top view of FIG. 1;

FIG. 3 is a vertical cross sectional view taken substantially along the line 3—3 of FIG. 2 and illustrating, by dotted lines, the valve opened and resetting positions;

FIG. 4 is a fragmentary elevational view looking in the direction of the arrows 4—4 of FIG. 1;

FIG. 5 is a fragmentary vertical cross sectional view taken substantially along the line 5—5 of FIG. 1; and, FIG. 6 is a perspective view of the rupture band, per se.

DESCRIPTION OF THE PREFERRED EMBODIMENT

Like characters of reference designate like parts in those figures of the drawings in which they occur.

In the drawings:

The reference numeral 10 indicates the valve which is generally cylindrical. The valve 10 comprises a generally hollow body 12 having an inner wall surface 13 and an internally threaded lateral exhaust port 14 intermediate its ends. The body 12 is provided, at one end, with inlet means 16 adapted to be connected with a line 17 containing fluid under pressure. The other end portion of the body supports arm means 18, including band means 19, adapted to be ruptured by excess fluid pressure in the valve inlet end 16 for releasing such fluid pressure through the lateral port 14, as presently explained. The term "rupture" as used herein indicates a longitudinal stretching exceeding the tensile strength of the band means as opposed to a shearing action of frangible material.

The end portion of the valve body 12, opposite the inlet 16, is longitudinally centrally bored and counterbored, as at 20 and 22.

The inlet means 16 comprises a sleeve 26 having external threads 28 and 30 at its respective ends threadedly received by the body inner wall 13 and the pressure line 17, respectively. The sleeve bore 31 forms a fluid inlet passage. Obviously, the sleeve 26 may be internally threaded for receiving the pressure line 17, if desired. The inwardly disposed end of the sleeve 26 is counterbored and threaded, as at 32, for receiving a bushing 34.

The bore 36 of the bushing 34 forms a sealing face for the purposes presently explained. The inward end of the bore 36 tapers outwardly, as at 38, to form a tapered surface facing the counterbore 22. O-rings, or the like, 40 and 42 seal the sleeve threads 28 and 32 with the valve body and bushing, respectively.

The body bore 20 slidably receives the stem 44 of a valve means 46. One end of the stem 44 projects beyond the body end 48 opposite the inlet passage 31. The valve means 46 comprises a piston-like valve 50 formed on the end portion of the stem 44 opposite the body end 48 and is closely received slidably by the sealing face 36 and is normally disposed intermediate the ends of the bushing 34. Packing 52 surrounds the valve stem 44 adjacent the surface of the valve 50 facing the inlet end of the sleeve 26 and is held in place by a washer 54 and clip 56 secured to the valve stem. Fluid pressure in the sleeve bore 31 seals the packing 52 with the sealing face 36.

The arm means 18 comprises a brace arm 60 projecting radially outward from and preferably formed integral with the end portion of the valve body or housing 12 opposite the inlet passage 31. The outwardly projecting end portion 62 of the arm 60 is integrally connected with one end of a horizontally disposed cylinder 64, as viewed in FIGS. 1 and 3, of selected diameter, for example, diametrically substantially equal to the transverse dimension of the arm 60 for the purpose presently apparent. The other end 66 of the cylinder terminates in close spaced relation with respect to the adjacent end portion of the valve stem 44. That portion of the arm 60, facing the cylinder 64, is provided with an arcuate groove 68 (FIG. 5) coextensive with the cylinder 64 which loosely surrounds, in close spaced relation, the adjacent circumferential portion of the cylinder, for the purposes presently explained.

The cylinder 64 is provided with a coextensive radial slot or groove 70 open in the direction opposite the arm groove 68 and which is extended through the arm end portion 62 to define a pair of upstanding ears 72, as viewed in FIGS. 3 and 5. In the example shown, the width and depth of the groove 70 is substantially equal to the radius of the cylinder 64.

A lever 74 is freely received by the cylinder groove 70 and is pivotally connected at one end between the ears 72 by a pin 76 extending through the ears and lever for vertical pivoting movement of the lever about the axis of the pin 76. The other end portion 78 of the lever projects beyond the cylinder end 66 and overlies the adjacent outwardly projecting end surface 80 of the stem 44. The height or vertical thickness of the layer 74, as viewed in FIGS. 3 and 5, is such that its central longitudinal upper surface 82 substantially coincides with the cylindrical plane generated by the cylinder 64 when the lever 74 is disposed within the cylinder slot 70. Obviously, the groove 70 may be formed deeper and the lever 74 pivotally connected intermediate its ends with the cylinder 64 for vertical pivoting movement of the respective ends of the lever. The upper surface of the lever and the circumference of the cylinder is provided with a series of longitudinal equally spaced-apart circumferential relatively shallow grooves 84 of a selected width and depth with the bottom surface of the respective groove preferably converging toward the lever end portion 78.

The band means 19 comprises an endless band preferably formed from metallic material of selected thickness having a width cooperatively received by any one of the circumferential grooves 84 and an inside diameter permitting the band to be manually moved from one groove 84 to another when the lever is in contact with the bottom surface of the cylinder groove 70. The depth of the grooves 84 is preferably no greater than the thickness of the band 19. The thickness of the material forming the endless ring or band 19 is predetermined in accordance with the known tensile strength of the metallic material used so that, when the band means 19 is disposed within one of the grooves 84, as illustrated by FIG. 3, the band 19, by holding the lever within the cylinder groove 70 and bearing against the outwardly projecting end of the stem 44, normally maintains the valve means 46 seated in valve closed position against a predetermined pressure in the inlet end of the valve.

The purpose of the grooves 84 is to eliminate sharp corners on the upper edge surfaces of the lever 74 when surrounded by the band 19 which would tend to deform and generate a shearing action on the band in response to fluid pressure against the valve means. The grooves 84 further prevent accidental displacement of the band 19 into another or adjacent groove 84 during shipping or handling which would change the valve pressure rating.

OPERATION

In operation, the band 19 is positioned in a selected one of the lever and cylinder grooves 84 in accordance with a predetermined pressure against the valve inlet to be reached before the valve opens to release pressure. Thus, the band means 19 maintains the valve means 46 seated and sealed with the valve seat 36 by the lever end portion 78 overlying the outwardly projecting end of the valve stem 44 until the fluid pressure against the valve means 46 exceeds the predetermined pressure. In this event, the valve stem 44 is moved further outwardly of the valve body toward its upper dotted line position wherein the band means 19 is broken or ruptured by expanding the endless band beyond its tensile strength limit which releases the lever 74 to move upwardly toward its dotted line position of FIG. 3, thus unseating the valve means 46 and discharging the excess pressure through the outlet port 14.

The valve may be readily reset in the field, after correcting the excess pressure problems by manually moving the valve stem and valve means 46 to its downward dotted line out-of-the-way position of FIG. 3, repositioning the lever 74 in the cylinder slot 70 and installing a new band means 19 in a selected one of the circumferential grooves 84 by passing it over the free end portions of the lever and cylinder.

Obviously, the lever may be provided, adjacent the respective groove 84, with indicia, not shown, indicating the pressure the valve 10 is designed to protect when the band 19 is in the respective circumferential groove. The purpose of the cylinder partial wraparound arm groove 68 is to prevent workmen in the field tying down the lever 74 within the cylinder groove, as by wrapping wire, or the like, around the cylinder and lever which would create a hazard and defeat the purpose of selected excess pressure release action of the valve. Similarly, the upwardly inclined lower surface of the brace arm 60, as viewed in FIGS. 1 and 3, tends to discourage a wire wraparound of the lever 74, cylinder 64 and arm 60 in the field.

Obviously the invention is susceptible to changes or alterations without defeating its practicability. Therefore, I do not wish to be confined to the preferred embodiment shown in the drawings and described herein.

I claim:

1. A relief valve, comprising:

a housing;

means at one end of the housing forming an inlet passage;

valve means normally closing the inlet passage,
  said valve means including a stem slidably projecting through the housing end opposite the inlet passage;

radially projecting arm means supported by the housing end portion opposite the inlet passage;

a lever normally abutting the outwardly projecting end surface of said valve stem in overlying relation and connected with said arm means for pivoting movement about an axis normal to the longitudinal axis of said valve stem; and, band means extending transversely across said arm means and said lever for maintaining said valve means in inlet passage closed position,
  said stem acting to pivot said lever relative to said arm means and extend said band means beyond its tensile strength limit and open the inlet passage in response to predetermined pressure against said valve means.

2. The relief valve according to claim 1 in which said arm means includes:

a cylinder having a coextensive slot open to its surface opposite the housing inlet passage for nesting the major longitudinal portion of said lever.

3. The relief valve according to claim 2 in which said band means comprises:

an endless band surrounding an intermediate portion of said cylinder and said lever when the latter is nested by said cylinder.

4. The relief valve according to claim 3 in which said cylinder and said lever are provided with a plurality of longitudinally spaced shallow circumferential grooves of less depth than their width for nesting an inner circumferential portion of said endless band when disposed therein.

5. The relief valve according to claim 4 in which said arm means further includes:

a brace arm connecting the end of said cylinder remote from the axis of said stem with said housing,
  said brace arm having a transverse arcuate groove longitudinally nesting a peripheral portion of said cylinder opposite the position of said lever.

6. The relief valve according to claim 5 in which said inlet passage means comprises:

a sleeve secured at one end within said housing; and, a bushing secured within the inwardly disposed end portion of said sleeve for forming a sealing face surrounding said valve means.

7. The relief valve means according to claim 6 in which said valve means further includes:

a piston surrounding said stem; and, sealing means secured to said stem adjacent the face of said piston opposite the outwardly projecting end of said stem for sealing with said sealing face.

* * * * *